(12) United States Patent
Koch et al.

(10) Patent No.: US 6,341,870 B1
(45) Date of Patent: Jan. 29, 2002

(54) DEVICE FOR CHANGING THE LENGTH OF THE RUNNING PATH OF AN ELECTROMAGNETIC WAVE

(75) Inventors: Peter Koch, Luebeck; Christian Scholz, Norderstedt; Ralf Engelhardt; Stefan Kubasiak, both of Luebeck, all of (DE)

(73) Assignee: Medizinisches Laserzentrum Luebeck GmbH (DE)

( * ) Notice: Subject to any disclaimer, the term of this patent is extended or adjusted under 35 U.S.C. 154(b) by 0 days.

(21) Appl. No.: 09/579,968

(22) Filed: May 26, 2000

(30) Foreign Application Priority Data

May 29, 1999 (DE) .......................... 199 24 824

(51) Int. Cl.[7] ................................ G02B 5/08
(52) U.S. Cl. .................... 359/850; 359/856; 359/857; 359/861
(58) Field of Search ................ 359/850, 856, 359/857, 861, 862, 197, 198, 199, 212, 213, 216, 223, 871, 873

(56) References Cited

U.S. PATENT DOCUMENTS 4,953,961 A * 9/1990 Ubhayakar .................. 359/213
5,136,415 A * 8/1992 Bean .......................... 359/213
5,220,643 A   6/1993 Edelstein et al.
5,784,186 A   7/1998 Wang et al.

FOREIGN PATENT DOCUMENTS

DE       19535743 A1   3/1997

OTHER PUBLICATIONS

Rollins et al, In vivo video rate optical coherence tomography, Optics Express, Sep. 14, 1998, 219–228, 3–6, US.

* cited by examiner

Primary Examiner—Mohammad Sikder
(74) Attorney, Agent, or Firm—Jacox, Meckstroth & Jenkins

(57) ABSTRACT

The device serves the change of the length of the running path of an electromagnetic wave, and specifically of a light beam between the emitter and receiver. It comprises two oppositely lying reflection means between which the beam is reflected, as well as a means for changing the distance of these reflection means. The reflection means are arranged at an angle $\beta$ to one another which lies between 0° and 45° so that the incident beam is thrown to and fro several times between the reflection means, until it is finally congruently thrown back.

29 Claims, 5 Drawing Sheets

DEVICE FOR CHANGING THE LENGTH OF THE RUNNING PATH OF AN ELECTROMAGNETIC WAVE

BACKGROUND OF THE INVENTION

The invention relates to a device for changing a length of a running path of an electromagnetic wave, according to the features specified in the preamble of claim 1.

Prior art electromagnetic wave devices were serve for changing the time of travel of a beam, for producing a Doppler shift, for producing a time-dependent spectrum or likewise. They are for example used with optical coherence tomography (OCT), with absorption measurement or also with Fourier transform spectroscopy. Generally such devices can be applied when it is necessary to change the optical path length of a beam path.

From U.S. Pat. No. 5,220,463 there is known such a device. Here the change of a path length of the light beam is produced by way of a crank drive, wherein at the end of the crank rod there is arranged a retroreflector which runs on a parallel guide so that the reflector or the reflector pair with each rotation of the crank moves forwards and backwards by a path length which corresponds to double the distance between the linkage point of the crank rod and the rotational axis of the shaft. The light beam runs roughly five times through the space lying between the reflection means before it leaves the arrangement deflected by a mirror transverse to the incidence direction. The change in wavelength and change in time of travel to be achieved by way of this is comparatively low since the light beam is thrown to and fro only a few times between the reflection means before it exits. An enlargement of the mirror reflectors or retroreflectors may here hardly provide any help since with an increasing size also the inertia properties of the moved parts are negatively influenced. The system thus meets its physical limits. A further disadvantage is that on account of the conversion of the rotary drive into a translatory movement the translatory movement is not linear but dependent on the angle position of the crank.

Inasmuch as this is concerned the device of U.S. Pat. No. 5,784,186 is more favorable with which the mirror arrangements are arranged on a rotating disk. With this although indeed a practical path length change is effected over time, however this path length change itself is quite small since the beam is only reflected once and thus a multiplication factor is absent.

The problems resulting in this context in particular with coherence tomography are for example described in the article "in vivo video rate optical coherence tomography" of Andrew M. Rollins amongst others in OPTIC EXPRESS Vol. 3, No. 6 of 14.09.1998, pages 219 to 229, in particular on page 221.

BRIEF SUMMARY OF THE INVENTION

Against this state of the art it is the object of the invention to design a device for changing the path length of the running path of an electromagnetic wave, in particular a light beam such that as large, quick and controlled as possible variation of the time of travel is possible with simple means.

This object is achieved according to the invention by the features specified in the following description and claims. Advantageous formations of the invention are specified in the dependent claims as well as the subsequent description.

In one aspect, the invention comprises a device for changing a length of a running path of an electromagnetic wave, in particular of a light beam, with two reflection means arranged lying opposite, between which the beam is reflected, as well as with a means for changing a distance (a) of the reflection means, wherein the reflection means enclose an angle $\beta$, wherein $0°<\beta<45°$.

In another embodiment, the invention comprises a method for changing a length of an electromagnetic wave comprising the steps of situating a first reflector a distance (a) and in opposed relation to a second reflector; the first and second reflectors enclosing an angle $\beta$, wherein $0°<\beta<45°$; and reflecting the light between said first and second reflectors.

In another aspect, this invention comprises a device for changing a length of a running path of an electromagnetic wave, in particular of a light beam, with a first and second reflector arrange lying opposite, between which the beam is reflected, as well as with a driver for changing a distance (a) of the first and second reflectors, wherein said first and second reflectors enclose an angle $\beta$, wherein $0°<\beta 45°$.

According to the invention there are provided at least two oppositely lying reflection means between which the beam is reflected and whose distance may be changed. The arrangement of the reflection means is effected with this at an angle $\beta$ to one another which lies between $0°$ and $45°$ ($0°<\beta<45°$). The reflection means are thus arranged to one another such that they span an acute angle in a manner such that the light beam is thrown to an fro several times between the reflection means and with this runs through the whole width of the reflection means until finally the light beam at an angle of $90°$ impinges one of the reflection means and then runs back the same way. By way of this arrangement on the one hand a large path length change is achieved, since with a suitable selection of the angle the light beam is thrown to and fro many times until it has run through the width of the reflection means, and on the other hand there does not exist the danger that by way of distance change of the reflection means the light beam "falls out of the system". A further advantage of this arrangement is that the incident and the emergent beam coincide with a suitable arrangement. By way of the multitude of reflections between the means, already with a small displacement of the reflection means to one another a comparatively large path length change is achieved.

For example a mirror, a prism, a retroreflector or likewise may serve as a reflection means. In the simplest form the reflection means are formed by two mirrors arranged at an acute angle to one another, wherein the acute angle $\beta$ lies preferably in the region between $0.01°$ and $5°$. In order to let the beam reflect as often as possible between the mirrors, the angle $\beta$ is selected as flat as possible, thus the mirrors are arranged almost parallel to one another.

Instead of a mirror pair also a mirror may be combined with an oppositely lying retroreflector. The path length may be doubled by using two prisms as oppositely lying reflection means, wherein then when the incident and emergent beam are to coincide additionally a third reflection means is to be provided preferably in the form of a mirror.

The change of the distance of the reflection means to one another may be effected in a manner known per se, for example electromotorically by way of an eccentric drive, by way of an electromagnetic drive (e.g. moving coil), by way of a pneumatic drive or likewise. Preferably the drive is effected piezoelectrically, and specifically via a stack of piezoelements. The stack arrangement, i.e. the arrangement of several piezoelements behind one another ensures a sufficiently large displacement and thus the desired path length change. Alternatively to the stack arrangement also a single piezoelement may be provided which is impinged with a correspondingly high voltage in order to achieve the desired displacement. Since the piezoelements react very quickly with this also the control of a speed and path profile is possible which opens up further fields of application of the device. If additionally a distance transducer may be attached to the device such that the actual deflection of the movable deflection means may be determined there arises the possibility of controlling the position or speed of the reflection means to a predetermined profile. Selectively one or both of the oppositely lying reflection means may be arranged movable so that the path change with a suitable activation of the drive elements may be again increased.

In order to ensure that with the distance change the angle β of the reflection means to one another remains constant it is useful to suitably guide the movable reflections means. The parallel guiding may be effected in a manner known per se, for example by way of a sliding bearing, by way of a pneumatic bearing or likewise. Preferably the guiding of the movable part or of the movable parts is effected by way of a solid body joint, in particular a parallel leaf spring arrangement.

According to the used reflection means differing demands are to be fulfilled by the guide. If the movable reflection means is a mirror the guide firstly is to permit of course the desired translation along the Z-axis (see FIG. 2). If in the context with the desired translation an additional translatory movement along the Y-axis (see FIG. 2) sets in, this does not limit the manner of functioning of the device. The guide must however effectively suppress parasitic rotation movements about the Y and X axes (see FIG. 2) (yawing and pitching) (smaller than a few irad in the preferred embodiment example), since otherwise it may not be ensured that the beam exiting the device remains congruent with the beam entering the device.

If the movable reflection means is a prism the demands on a suitable tilting about the X-axis may be considerably lower since the use of a prism renders the device invariant against pitching movements. With the use of a retroreflector as a movable reflection means the device becomes invariant against all rotatory movements.

The field of application of the device according to the invention is varied. A preferred application is the use as a multipath cell in spectroscopy. With this the gas to be examined is located between the two reflection means. A further advantageous application of the device as a multipath cell lies in Fourier transform spectroscopy, wherein by way of the movable reflection means the necessary length change of the sample path may be achieved. Also the multipath cell formed with the device according to the invention may be used for absorption measurement, wherein by way of the movable reflection means the length of the absorption path is changed so that a differential measurement of the absorption coefficients is possible. A preferred application of the device lies in the optical coherence tomography, wherein the device here serves as a reference path of the used interferometer.

BRIEF DESCRIPTION OF THE DRAWINGS

The invention is hereinafter described by way of embodiment examples represented in the drawing. There are shown.

DETAILED DESCRIPTION OF THE INVENTION

There are provided two essentially oppositely lying reflection means 1 and 2 in the form of mirrors which are arranged at an acute angle β to one another. The mirrors 1, 2 are arranged such that only in the plane visible in FIG. 1 are they at an angle β to one another, and otherwise are axis parallel to one another.

Figure 1:
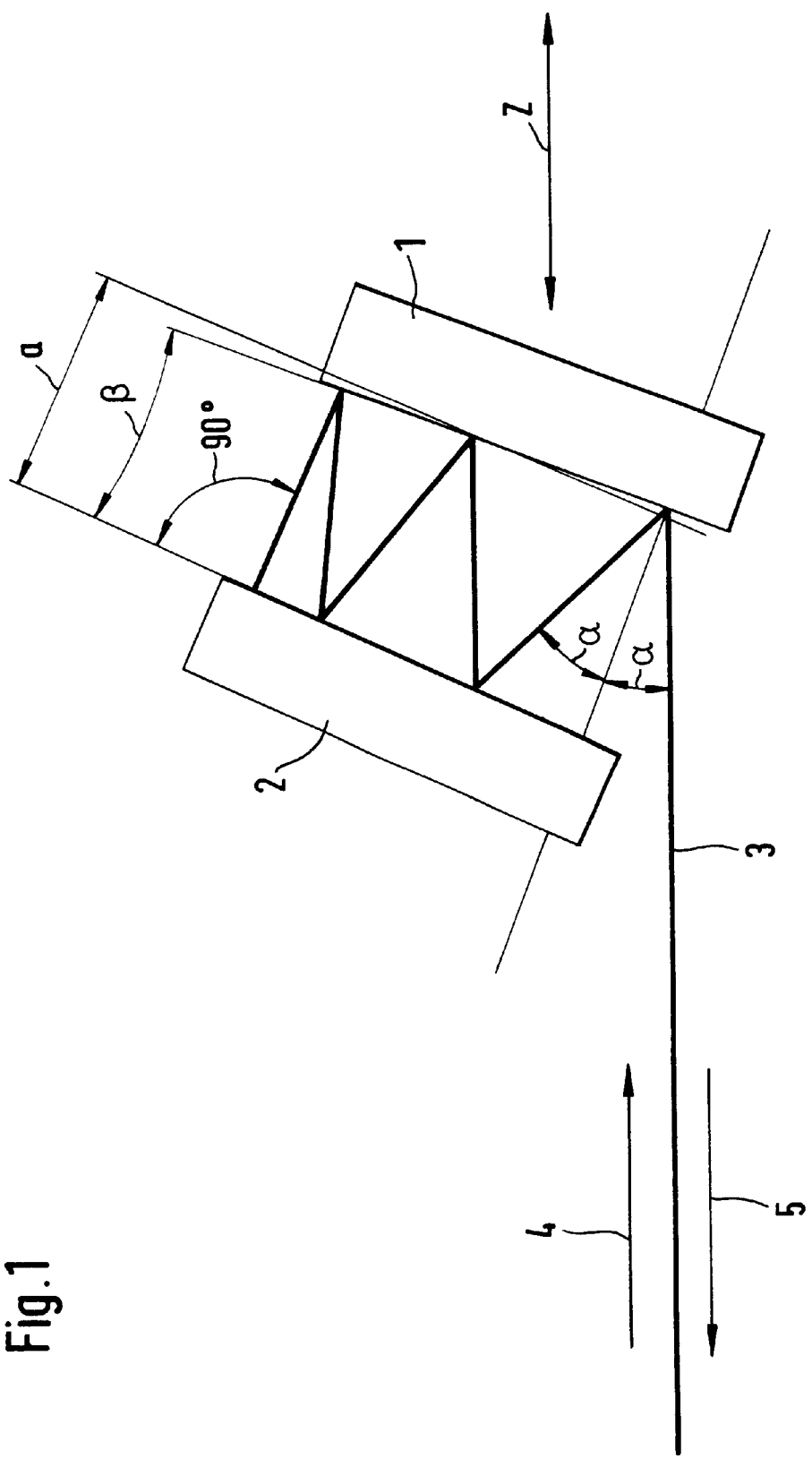
FIG. 1 the principle construction of the device according to the invention.

The representation according to FIG. 1 serves exclusively for the understanding of the manner of acting of the function and is neither true to scale or true to angle. The actual angle β in the preferred embodiment example is 0.27°. An incident light beam 3—the angle of incidence is indicated at 4—impinges with an angle of incidence α onto a first mirror 1 which reflects this with the same emergence angle to the mirror 2. The mirror 2 in turn throws the light beam 3 back to the mirror 1. The light beam 3 runs through the space formed between the mirrors 1 and 2, until it finally impinges the mirror 2 at an angle of 90°, whereupon it now runs back once again the same way, until finally the light beam again from the mirror 1 exits the arrangement. The exiting direction is indicated at 5. As is deduced from FIG. 1 the incident and the emergent light beam 3 are congruent. The angle of incidence α is 13° and is in the following relation to the angle β between the mirrors 1 and 2:

$$\alpha = n \cdot \beta$$

wherein n is the number of reflections between the mirrors 1 and 2.

If one by approximation fixes the distance between the mirrors 1 and 2 as an average distance a, then there results by approximation the path distance s which is covered by the beamed-in light beam between the mirrors until the exit as follows:

$$s = n \cdot a$$

If one then with a suitable choice of movement direction moves the mirrors 1 and 2 while maintaining the angle β to one another, for example in the direction z, there results a path distance change Δs which corresponds to the number of reflections multiplied by the change in distance $$\Delta s = n \cdot a.$$

In order for example to achieve a path length change of 2 mm a movement of the mirrors 1 and 2 to one another or a movement of the mirror 1 in the direction Z with respect to the mirror 2 of 45 μm is sufficient. With this the angle of incidence α is 13°, the average distance a of the mirrors to one another 7.55 mm (FIG. 1). With this there results a path length s of 350 mm with 46 reflections. It thus becomes clear that on account of the multiple reflections only a comparatively small distance change between the mirrors 1 and 2 is necessary in order to obtain a comparatively large path length change. Such a path length change may for example be produced by a piezotranslator, be it in the form of an individual piezoelement or a stack of piezoelements. The angle of incidence α should not be selected larger than 15° since otherwise the reflectivities of the mirrors become too small and with this the light losses in the delay path increase considerably.

Figure 2:
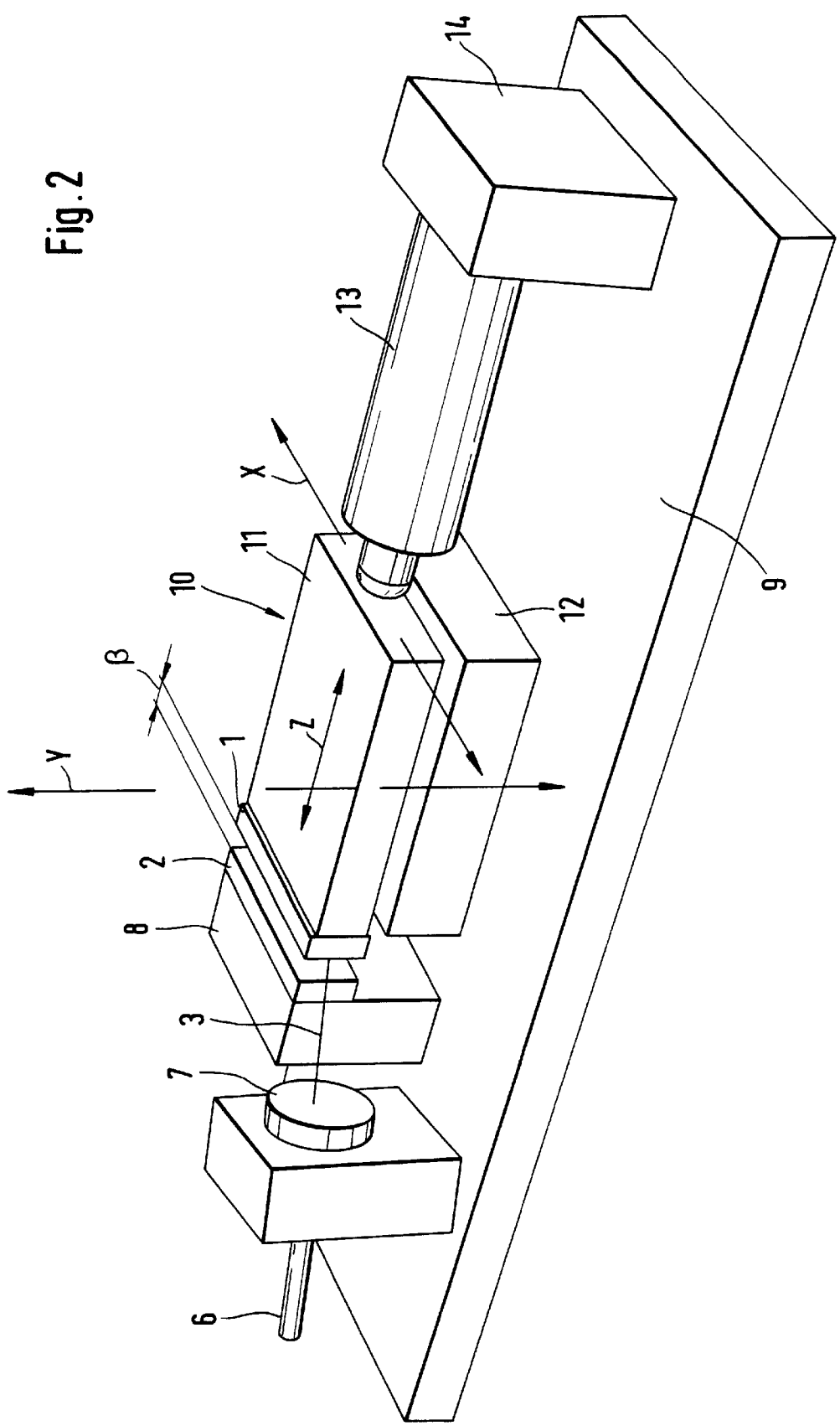
FIG. 2 a device with two mirrors as reflection means in a schematic perspective representation, FIG. 3 a device with a mirror and a prism in a representation according to FIG. 2, FIG. 4 schematically the beam course in the device according to FIG. 3 and FIG. 5 a device with two prisms and a mirror in the representation according to FIG. 2.

In FIG. 2 the mirror arrangement described by way of FIG. 1 is realized with respect to the device. The light beam which is produced in a light source which is not shown, for example in a laser, is introduced into the device via a fibre optic. At the end of the fibre optic 6 there is arranged a collimator 7 from which the light beam exits, impinges the mirror 1 at an angle α and in the described manner runs through the path between the mirrors 1 and 2. The mirror 2 via a stay 8 is fixedly and rigidly connected to a base plate 9, of the device, which forms the mechanical base and also the optical base of the device.

The mirror 1 is attached to a parallel leaf spring guide 10 whose upper part 11 is movably and whose lower part 12 is fixedly connected to the base plate 9. The upper and lower part 11 and 12 of the parallel leaf spring guide 10 are in a manner known per se connected to one another by leaf springs such that the upper part 1 is movable essentially in the direction Z, wherein the upper part 11 on account of the spring effect of the leaf springs not represented in the figure automatically returns back into a neutral home position. The upper part 11 is on the end-side distant to the mirror 1 impinged by a piezotranslator 13 which is supported on a stay 14 which is rigidly connected to the base plate 9. With the electrical impingement of the piezotranslator 13 there occurs a voltage-proportional length change of the piezo-element (or of the piezoelements). Preferably the device is operated such that the excitation via the piezotranslator by way a position sensor and a control circuit is tracked to the predetermined position profile.

Figure 3:
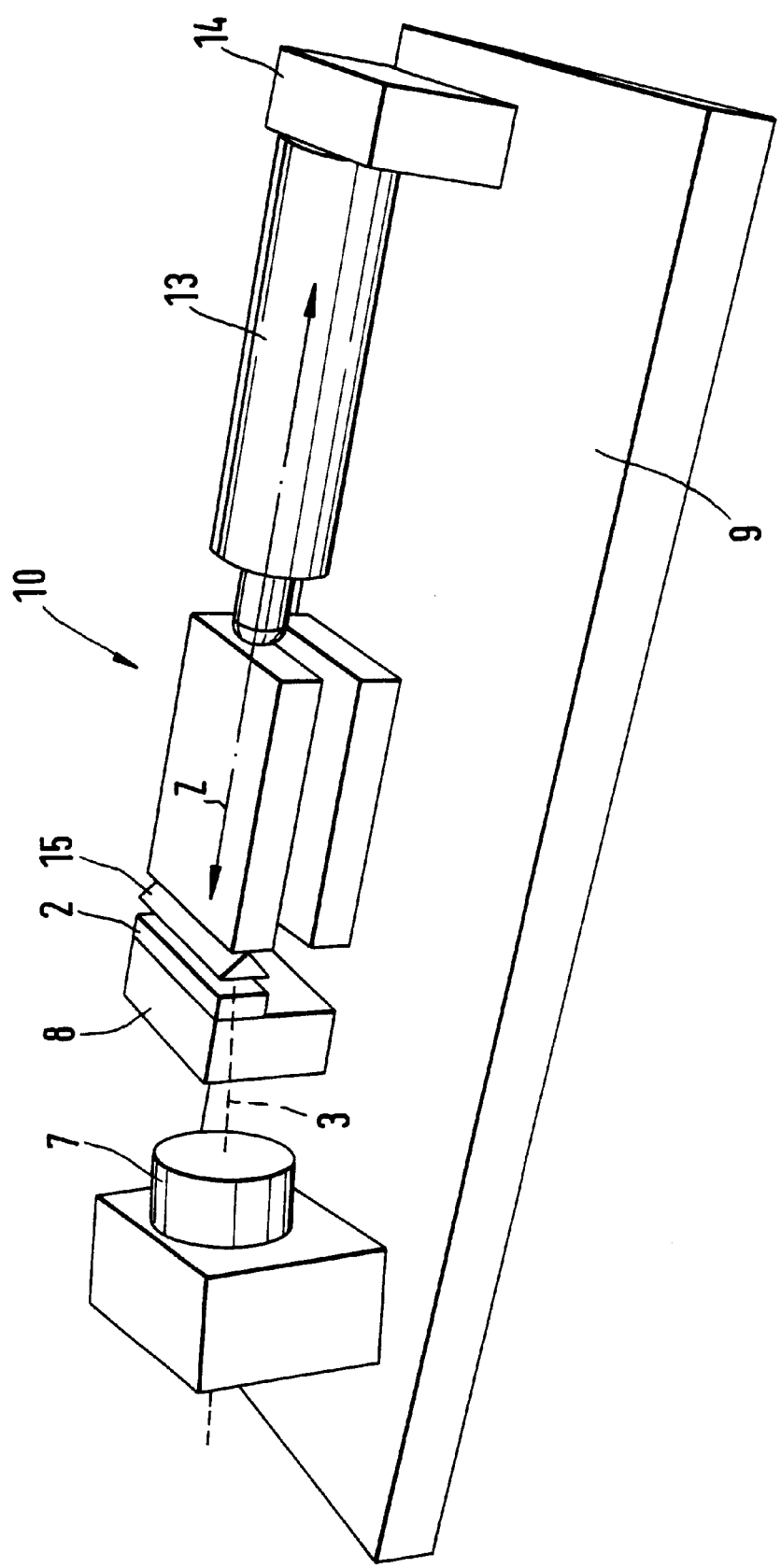
Figure 4:
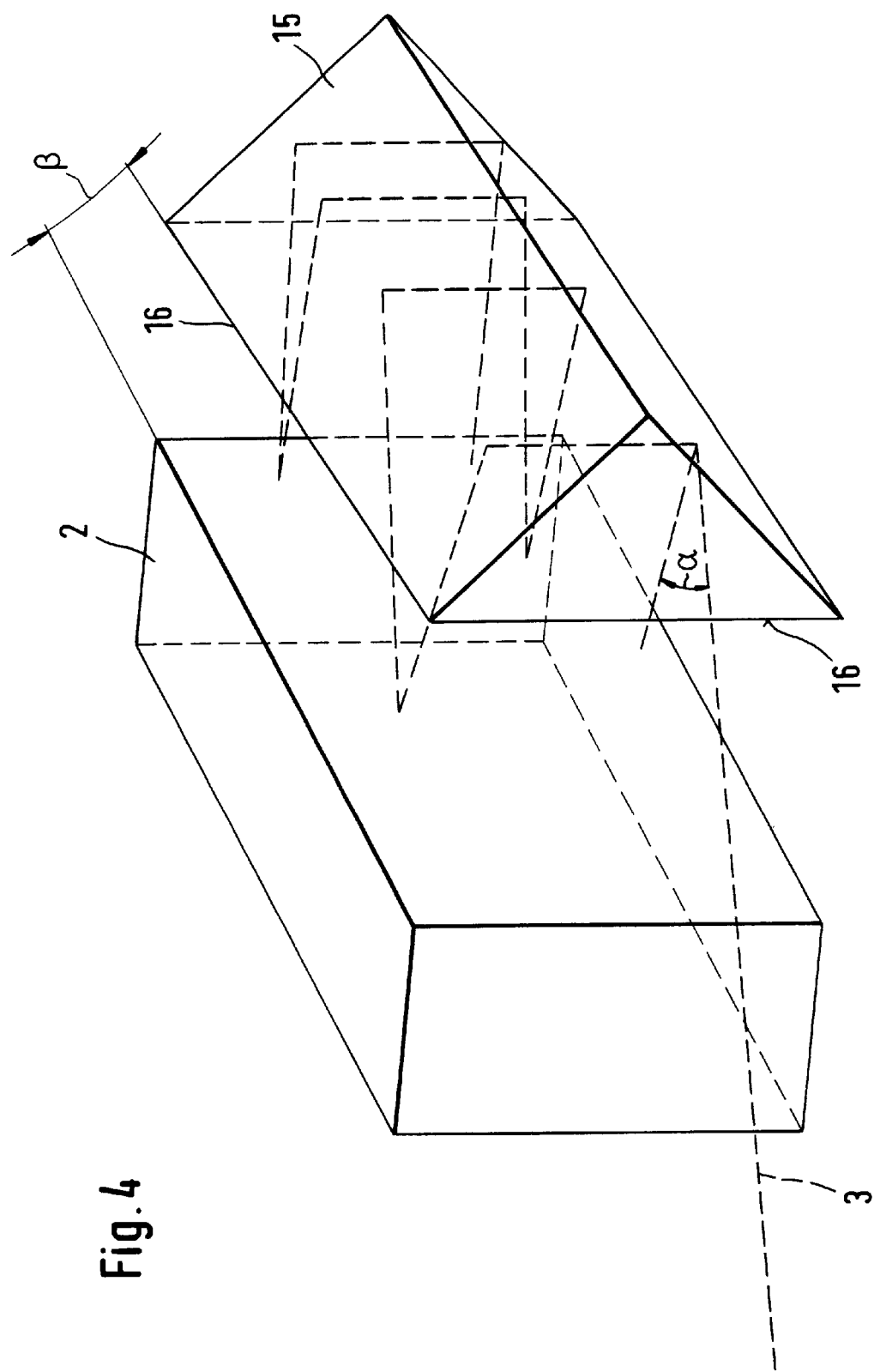

With the embodiment represented by way of FIG. 3 the mirror is replaced by a prism 15, otherwise the construction is identical to the device represented in FIG. 2. As the schematic representation of the beam course is made clear by way of FIG. 4 the distance which the beam 3 covers within the arrangement is increased by way of the prism; on the other hand the possible path length change remains the same in comparison to a mirror arrangement according to FIG. 2. The angle β is in this case spanned between the surface, of the mirror, facing the prism 15 and the oppositely lying base surface 16 (corresponds to the hypotenuse of the triangle formed in the cross section of the prism). Also the angle of incidence α is to be understood in relation to this base surface 16.

Figure 5:
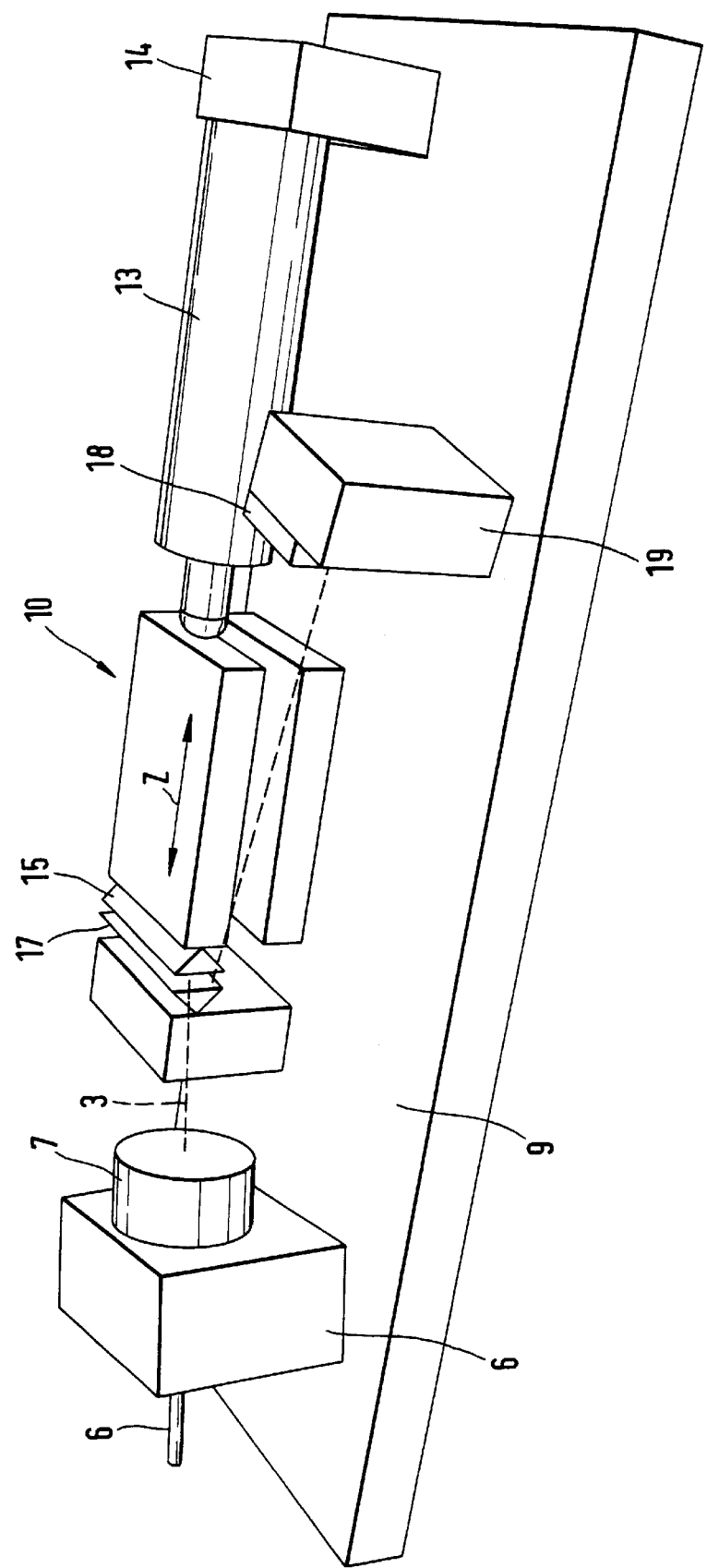

With the variant according to FIG. 5 the mirror 2 too is replaced by a prism 17. With this arrangement a mirror 18 lying obliquely opposite the prism 17 is necessary in order to bring the beam exiting the arrangement again to correspond with the entering beam 3. The mirror 18 is via a stay 19 likewise rigidly connected to the base plate 9. With this arrangement not only the distance but further also the possible path change is doubled with respect to the above described arrangements.

With the above described devices it is not only possible to control the path length change and thus the time of travel of the beam 3 between an emitter, e.g. a laser and a receiver, but furthermore by the provision of a suitable control or preferably regulation also a predetermined speed profile may be produced with which the path distance change is effected. In place of the piezotranslators shown in the embodiment examples also a magnetostrictive element in combination with a coil or another suitable device may be used. Also the described parallel leaf spring guide is only one of numerous conceivable variants, in order to ensure that the arrangement is only moved in the Z-direction. Furthermore also for the other reflection means 2 and 17 there may be provided a drive so that with a suitable synchronisation of both drives an even larger change in the path distance may be achieved.

Also the mirrors 1, 2 may be replaced by other suitable reflection means. Thus for example the mirror 2 may be replaced by a retroprism.

What is claimed is:

1. A device for changing a length of a running path of an electromagnetic wave, in particular of a light beam, with two reflection means arranged lying opposite, between which the beam is reflected, as well as with a means for changing the distance (a) of the reflection means, wherein the reflection means enclose an angle β, wherein 0°<β45°, and wherein the reflection means are arranged to one another such that the incident and emergent beam lie on the same axis.

2. A device according to claim 1, wherein at least one reflection means is formed by a mirror.

3. A device according to claim 1, wherein at least one reflection means is formed by a prism.

4. A device according to claim 1, wherein a reflection means is formed by a retroreflector.

5. A device according to claim 1, wherein the angle β is between 0.01° and 5°.

6. A device according to claim 1, wherein a reflection means is fixedly arranged and the other arranged movably at a constant angle to the first and wherein the movement is produced by at least one piezoelectric element.

7. A device according to claim 1, wherein the movement is produced by several piezoelectric elements which are arranged in a row behind one another into a stack.

8. A device according to claim 1, wherein a control, preferably a regulation is provided which moves at least one reflection means according to a predetermined speed profile.

9. A device according to claim 1, wherein the angle β is between 0.01° and 5°.

10. A device for changing a length of a running path of an electromagnetic wave, in particular of a light beam, with two reflection means arranged lying opposite, between which the beam is reflected, as well as with a means for changing the distance (a) of the reflection means, wherein the reflection means enclose an angle β, wherein 0°<β<45°, and wherein the angle of incidence α of the beam onto the first reflection means is between 5° and 25°, wherein α is always larger than β.

11. A device for changing a length of a running path of an electromagnetic wave, in particular of a light beam, with two reflection means arranged lying opposite, between which the beam is reflected, as well as with a means for changing the distance (a) of the reflection means, wherein the reflection means enclose an angle β, wherein 0°<β<45°, and wherein two reflection means in each case are movably arranged at a constant angle to one another.

12. A method for changing a length of an electromagnetic wave comprising the steps of:

situating a first reflector a distance (a) and in opposed relation to a second reflector; said first and second reflectors enclosing an angle β, wherein 0°<β<45°; and reflecting the light between said first and second reflectors; and wherein said situating step further comprises the step of:
    arranging said first and second reflectors such that an incident and emergent beam lie on a common axis.

13. The method as recited in claim 12, wherein said situating step further comprises the step of:

providing a mirror for each of said first and second reflectors.

14. The method as recited in claim 12, wherein said situating step further comprises the step of:

providing a prism as at least one of said first or second reflectors.

15. The method as recited in claim 12, wherein said situating step further comprises the step of:
providing a retroreflector as at least one of said first or second reflectors.

16. The method as recited in claim 12, wherein said angle β is between 0.01 degree and 5 degrees.

17. A method for changing a length of an electromagnetic wave comprising the steps of:
situating a first reflector a distance (a) and in opposed relation to a second reflector; said first and second reflectors enclosing an angle β, wherein 0°<β<45°; and
reflecting the light between said first and second reflectors; and
wherein an angle of incidence α of said electromagnetic wave onto said first reflector is between 5 degrees and 25 degrees and said angle α is always larger than angle β.

18. The method as recited in claim 17 wherein said method further comprises the step of:
using at least one piezoelectric element to move said first reflector at a constant angle relative to said second reflector.

19. A method for changing a length of an electromagnetic wave comprising the steps of:
situating a first reflector a distance (a) and in opposed relation to a second reflector; said first and second reflectors enclosing an angle β, wherein 0°<β45°; and
reflecting the light between said first and second reflectors; and
wherein said method further comprises the step of: moving both said first and second reflectors at a constant angle relative to one another.

20. The method as recited in claim 19 wherein said method further comprises the step of:
using a plurality of piezoelectric elements to move said first reflector at a constant angle relative to said second reflector, wherein said piezoelectric elements are arranged in a row behind one another in a stack.

21. The method as recited in claim 19 wherein said method further comprises the step of:
moving a least one of said first or second reflectors according to a predetermined speed profile.

22. A device for changing a length of a running path of an electromagnetic wave, in particular of a light beam, with two reflection means arranged lying opposite, between which the beam is reflected, as well as with a means for changing the distance (a) of the reflection means, wherein the reflection means enclose an angle β, wherein 0°<β<45°, and
a reflection means is fixedly arranged and the other arranged movably at a constant angle to the first and wherein the movement is produced by at least one piezoelectric element; and
wherein two reflection means in each case are movably arranged at a constant angle to one another.

23. A device according to claim 22, wherein at least one reflection means is formed by a mirror.

24. A device according to claim 22, wherein at least one reflection means is formed by a prism.

25. A device according to claim 22, wherein a reflection means is formed by a retroreflector.

26. A device according to claim 22, wherein the movement is produced by several piezoelectric elements which are arranged in a row behind one another into a stack.

27. A device according to claim 22, wherein a control, preferably a regulation is provided which moves at least one reflection means according to a predetermined speed profile.

28. A device for changing a length of a running path of an electromagnetic wave, in particular of a light beam, with two reflection means arranged lying opposite, between which the beam is reflected, as well as with a means for changing the distance (a) of the reflection means, wherein the reflection means enclose an angle β, wherein 0°<β<45°, and
a reflection means is fixedly arranged and the other arranged movably at a constant angle to the first and wherein the movement is produced by at least one piezoelectric element; and
wherein the reflection means are arranged to one another such that the incident and emergent beam lie on the same axis.

29. A device for changing a length of a running path of an electromagnetic wave, in particular of a light beam, with two reflection means arranged lying opposite, between which the beam is reflected, as well as with a means for changing the distance (a) of the reflection means, wherein the reflection means enclose an angle β, wherein 0°<β<45°, and
a reflection means is fixedly arranged and the other arranged movably at a constant angle to the first and wherein the movement is produced by at least one piezoelectric element; and
wherein the angle of incidence α of the beam onto the first reflection means is between 5° and 25°, wherein α is always larger than β.

* * * * *